UNITED STATES PATENT OFFICE.

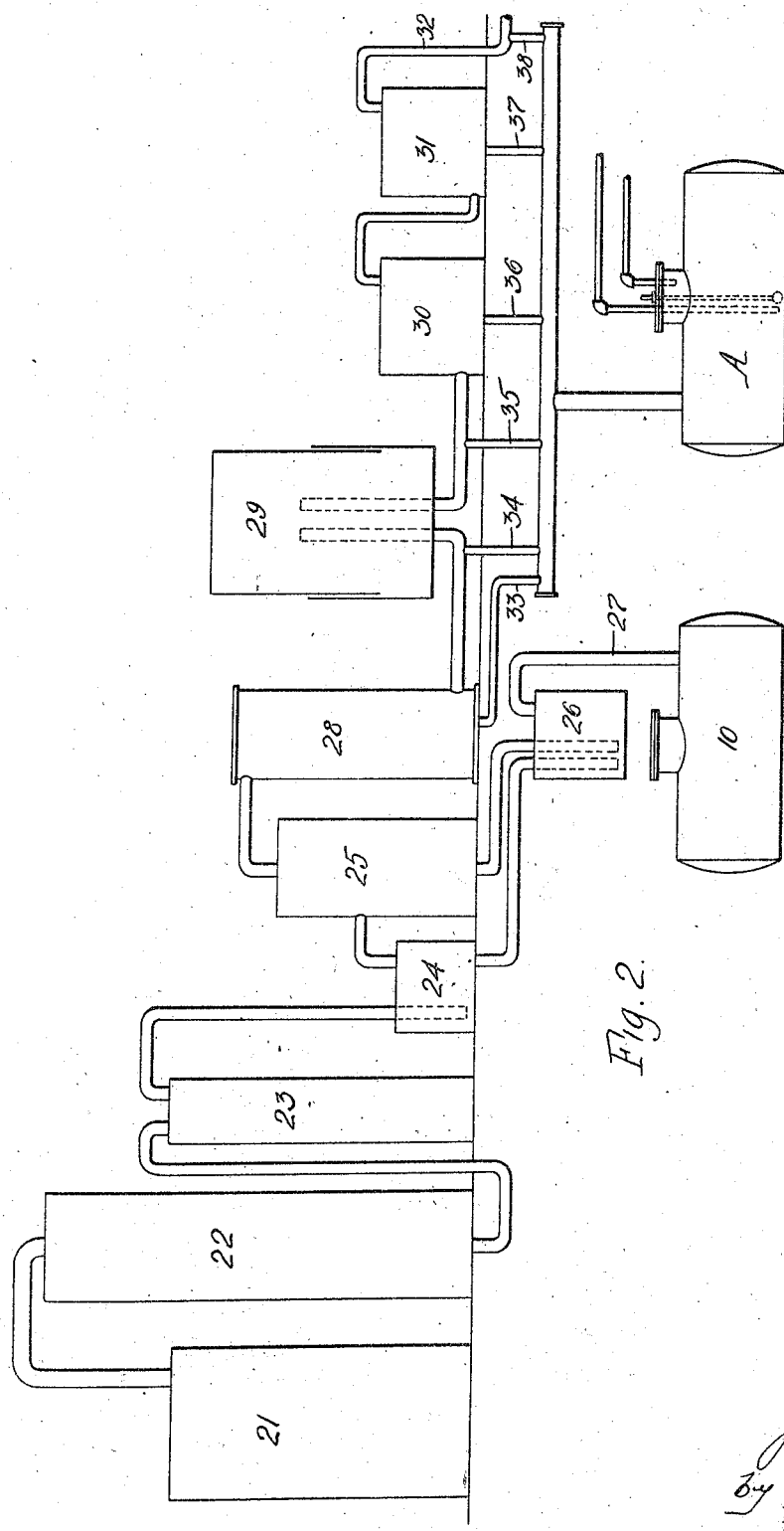

JAMES GREER, OF EAST ORANGE, NEW JERSEY.

INFLAMMABLE LIQUID AND PROCESS OF PRODUCING THE SAME.

1,236,557.     Specification of Letters Patent.     Patented Aug. 14, 1917.

Application filed May 24, 1915. Serial No. 30,044.

*To all whom it may concern:*

Be it known that I, JAMES GREER, a citizen of the United States, residing at East Orange, in the county of Essex and State of New Jersey, have invented a new and useful Improvement in Inflammable Liquids and Process of Producing the Same, of which the following is a specification.

In the manufacture of illuminating gas by the oil, coal and water-gas processes, a liquor is produced resulting from condensation in the passage of the gas through the condensers, scrubbers, purifiers, and in the pipes connecting these parts with each other and with the gas-holders, which under present methods is led as a waste product to the open tar well and there joins the other waste by-products.

I have discovered that the above waste liquor contains a new and valuable oil, extremely volatile, which under the usual process is evaporated and lost by exposure of the liquor to the atmosphere in the open tar well, the heat of the latter tending to accelerate such evaporation.

The process for conserving this volatile product consists in preventing evaporation by sealing the receptacles containing the liquor, distilling the latter at low temperatures and condensing the vapors of distillation.

In the accompanying drawings forming a part of this specification:

Fig. 2 shows diagrammatically a plant for making water gas, showing where the waste liquor is derived, from which the liquid embodying the invention is produced.

Figure 1:
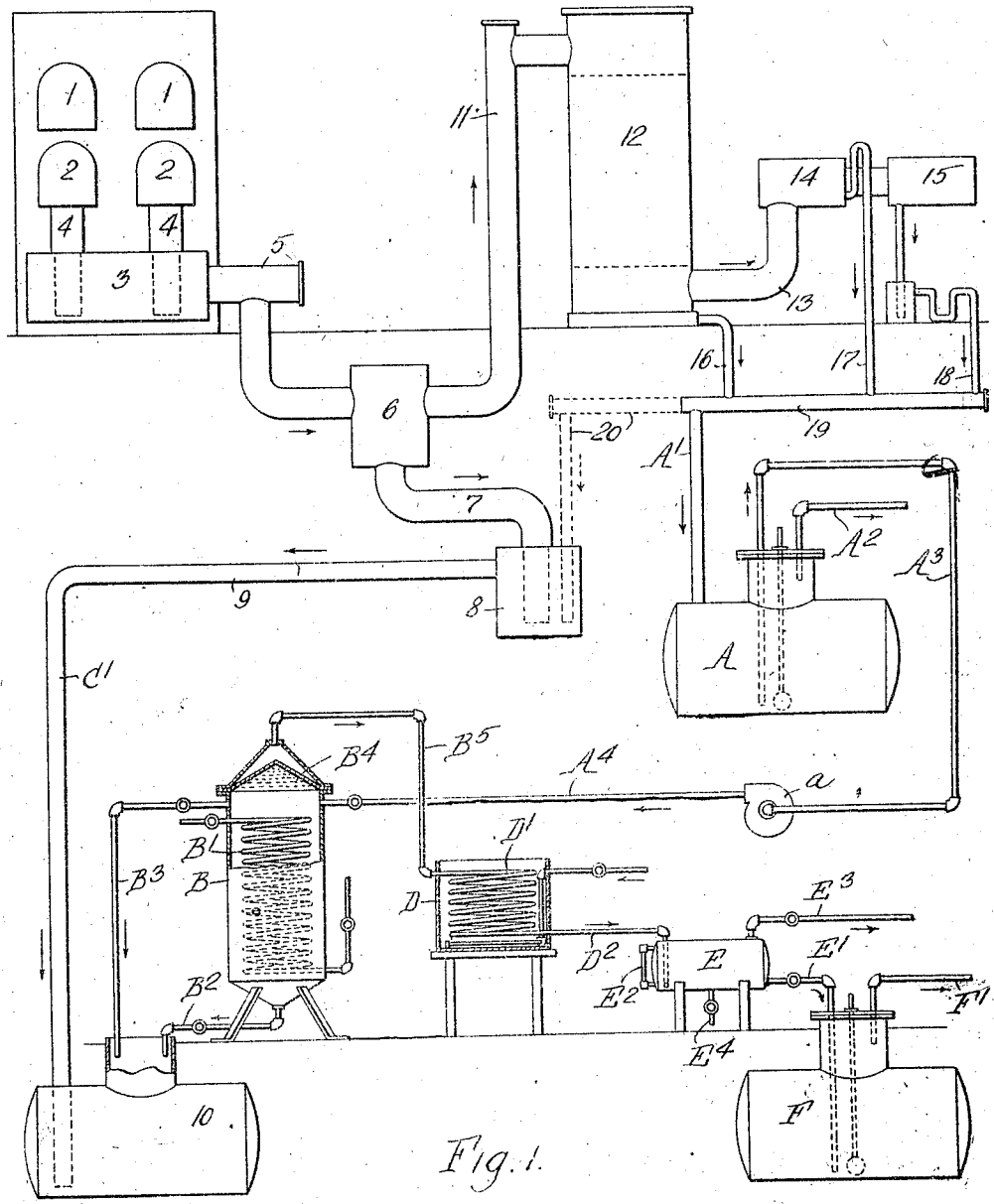
Figure 1 shows diagrammatically an apparatus for carrying out the process in connection with a plant for making Pintsch gas.

The liquid embodying the invention is derived from the waste liquor which collects in the condensers, scrubbers, purifiers, meters, gasometers, and pipes connecting these parts with each other in any gas-producing plant in which oil is used in the manufacture of the gas, for example, in the manufacture of water gas, Pintsch gas, and the like. In the drawing, which shows diagrammatically one type of gas manufacturing plant of well known construction for making Pintsch gas, from which the liquid embodying the invention may be derived, 1 represents the usual retorts in which oil is converted into a gas. The gas is conducted from the retorts 1 to super-heaters 2 and then to a tar seal 3 through pipes 4, the lower or discharge ends of which are immersed in the hot tar, causing the gas to pass through the tar. The gas and the tar overflowing from the tar seal 3 pass through a gas and tar main 5 to a tar pot 6. A pipe 7 conducts the tar from the tar pot 6 to a tar trap 8 from which the tar overflows through a pipe 9 to a tar well 10. The hot gas from the tar pot 6 passes through a gas main 11 to a condenser 12 and leaves the condenser through a main 13 leading to a washer 14 and thence through a purifier 15. From the purifier 15 the gas may be conducted to meters, low pressure gas-holders or gasometers or any other apparatus (not shown). All of these parts have heretofore been used in the manufacture of gas and of themselves form no part of this invention.

When the gas passes through the condensers, washers and purifiers, a waste liquor separates or distils from the gas and is withdrawn therefrom through pipes 16, 17 and 18 respectively, which discharge the liquor into a waste or drip pipe manifold 19. This manifold heretofore was connected by pipes 20, shown in dotted lines, with the tar trap, so that this waste liquor found its way to the tar well, in which the liquid embodying the invention, being very volatile, passed into the atmosphere in the form of gas.

In the manufacture of the liquid or oil embodying the invention, the waste liquor from the manifold 19 is received through a pipe A' in the closed tank A which is vented through a pipe A² to the gas holder, not shown, thus maintaining gas pressure in the tank and preventing evaporation of the volatile elements in the liquor.

The gas producing plant shown diagrammatically in Fig. 2 is of the type commonly employed in city gas works for making water gas. In this figure, 21 represents the generator which is charged with coal heated to a high temperature and through which steam is blown. The resulting gas is conducted into a carbureter 22 in which the oil is mixed with the gas for the purpose of increasing the illuminating power of the gas. From the carbureter the gas enters a superheater 23 which converts the gas into a fixed gas. From the super-heater the gas passes through a washer 24 in which the gas passes through water, thus removing some of the tar. The gas then enters a scrubber 25 in which more of the tar is separated from the gas. The tar from the washer 24 and scrubber 25 is conducted through a seal 26 to a discharge 27 connected with the hot tar well. The gas from the scrubber passes through a condenser 28 into a relief holder 29, from which it is drawn by an exhausting engine (not shown) and propelled through a dry scrubber 30 and through a purifier 31, being discharged from the purifier through a pipe 32 leading to a gasometer or gas holder or other device not shown.

The drippings or liquor formed in the condenser 28, relief holder 29, dry scrubber 30, purifier 31, gasometer, and the pipes connecting these members, is collected by means of pipes 33, 34, 35, 36, 37 and 38, all of which pipes lead to the closed tank A. The pipes 33-38 inclusive heretofore discharged the drippings into the hot tar well, together with the pipe 27, but in the manufacture of the liquid embodying the invention the liquor passing through the pipes 33, 34, 35, 36, 37 and 38 inclusive is utilized as hereinafter described.

B, Fig. 1, is a still equipped with a steam coil B' through which heat is supplied to the contents and controlled by suitable valves. The undistilled residue is discharged from the still to the tar well C through the discharge pipe B², and B³ is an overflow pipe leading to the same well which also receives the waste products from the tar seals through the pipe C' as usual.

The pipe A³ from the tank A leads to a tar pump $a$ by which the liquor in the tank is delivered to the still through the pipe A⁴.

When the still has been thus supplied the temperature is gradually raised by the admission of steam to the coil B' until the desired volatile matter in the liquor vaporizes and passes through the perforated diaphragm or baffle plate B⁴ at the top of the still, serving to arrest any heavy particles carried in suspension in the vapor, and thence through the pipe B⁵ to a condenser D containing the usual worm D' bathed in cooling water, where it is condensed and passes in liquid form to a receiver E. The delivery pipe D² from the condenser reaches nearly to the bottom of the receiver and is sealed by the accumulation of water of condensation beneath the lighter oil floating thereon, the proportion of water and oil being indicated in the gage glass E².

The receiver is a closed tank vented through the pipe E³ to the gas holder and is subject to the pressure of the latter. Water is drawn off through the pipe E⁴ until the level falls below the intake of the oil delivery pipe E' which is sufficiently above the discharge end of the pipe D² to insure maintenance of the water seal, and the oil thus accumulated in the receiver is the product sought and is discharged into the closed oil tank F from which it is drawn as required. The reservoir F is also closed, and vented through the pipe F' to the gas holder.

The pressure from the gas holder is slight but sufficient to prevent the evaporation and escape of the volatile constituents throughout the apparatus and is virtually the same as that under which the waste liquor is produced in the gas plant.

The tar may be cooled and received with the waste liquor or drippings in a sealed tar well, vented to the gas holder or otherwise supplied with the required pressure, and the whole distilled to extract the same oil, but experiments indicate the quantity of the desired elements contained in the tar is relatively very small while the drippings are rich in oil. It is therefore preferable to hold the rich liquor sealed against evaporation separate from the tar products.

The distillate recovered from the liquor, either distilled separately from the tar or from the mixed tar and rich liquor, is the light, volatile, inflammable oil which it is the object of this invention to obtain.

The liquor is distilled preferably at temperatures rising up to 150° C.; at that temperature, if the liquor treated be derived from the manufacture of Pintsch or oil gas, about 51.5 per cent. or more will pass over to the condenser, depending upon the character of the oil used in the manufacture of the oil gas, approximately as follows:

| | |
|---|---|
| Distilled to 100° C | 12.5% |
| 100° C. to 140° C | 30.0% |
| 140° C. to 150° C | 9.0% |
| | 51.5% |

The residue consists of heavy hydrocarbons and tars.

The distillate produced at temperatures rising to 150° C. is a volatile, oil-like liquid having substantially the following characteristics:

| | |
|---|---|
| Color | Medium straw. |
| Specific gravity | About .841 to .861 |
| Flash | About 3° F. |
| Fire | About 27° F. |
| First drop distils at | About 120° F. |
| Distillate up to 200° F | About 35.2% |
| Distillate up to 200° to 225° F | About 42.8% |
| Distillate up to 225° to 250° F | About 12.6% |
| Distillate up to 250° to 275° F | About 5.4% |
| Residue | About 2.0% |
| Unaccounted | About 2.0% |
| Time of burning 40 cc | About 12 min. |

The new product is adapted for various purposes. It provides a cheap and efficient substitute for gasolene and analogous fuels in internal combustion engines and other uses. The addition of a relatively small proportion of the new oil to gasolene used in internal combustion engines materially increases the efficiency of such engines and has the valuable property of preventing the deposition of carbon in the cylinders. It is especially well adapted for use in melting snow and ice on switches and other railroad appliances and on man-hole covers and like devices, for the reason that its extreme volatility maintains a continuous flame when distributed upon ice or snow, practically until entirely consumed, and without the offensive odor attending the use of Pintsch hydrocarbon oil for snow melting purposes.

I claim as my invention:

1. The herein described light, volatile, inflammable liquid, derived from the distillation at temperatures up to 150° C. of the waste liquor produced in the condensers, scrubbers, purifiers, and pipes connecting these parts in the manufacture of illuminating gas when oil is used in the manufacture of the gas, said liquid being light-colored oil-like and having a flashing point about 3° F., and a specific gravity of approximately .841 to .861.

2. The herein described light, volatile, inflammable liquid, derived from the distillation at temperatures up to 150° C. of waste liquor produced in the manufacture of illuminating gas when oil is used in the manufacture of the gas, said liquor being deposited before the gas passes out of the gas holder, said liquid being a light-colored, oil-like liquid having approximately a specific gravity of .841 to .861, a flashing point about 3° F., and a firing point of about 27° F.

3. The method of producing the herein described volatile, inflammable liquid, which consists in collecting the liquor produced in the manufacture of illuminating gas before the gas passes out of the gas holder and when oil is used in the manufacture of the gas, holding the liquor from exposure to the atmosphere at substantially the usual pressure of the illuminating gas, distilling such liquor at temperatures rising to 150° C., and collecting the distillate.

4. The method of producing the herein described volatile, inflammable liquid, which consists in collecting the liquor condensed in the condensers, scrubbers and purifiers and pipes connected therewith in the manufacture of illuminating gas without exposure to the atmosphere, said liquor being produced when oil is used in the manufacture of the gas, holding the liquor under pressure sufficient to prevent evaporation, distilling such liquor at temperatures rising to 150° C., and collecting the distillate.

5. The method of producing the herein described volatile, inflammable liquid, which consists in collecting the liquor condensed in the manufacture of illuminating gas without exposure to the atmosphere, said liquor being deposited before the gas passes out of the low pressure gas holder and being produced when oil is used in the manufacture of the gas, holding the liquor in a closed receptacle having a vent to the gas holder of such gas-producing plant, distilling such liquor at temperatures rising up to 150° C., and collecting the distillate.

6. The method of producing the herein described volatile, inflammable liquid, which consists in collecting the liquor condensed in the manufacture of illuminating gas without exposure to the atmosphere, said liquor being deposited before the gas passes out of the low pressure gas holder and being produced when oil is used in the manufacture of the gas, holding the liquor in a closed receptacle at the pressure of the gas holder of such gas-producing plant, distilling the liquor at such pressure at temperatures rising to 150° C., and collecting the distillate.

7. The herein described light, volatile, inflammable liquid derived from the distillation of the waste liquor produced in the manufacture of illuminating gas and held at the pressure of such gas-producing plant, said liquor being deposited before the gas passes out of the low pressure gas holder, and being produced when oil is used in the manufacture of the gas, the liquor having approximately the following characteristics:—first drop distils at about 120° F.; distilled up to 200° F., 35.2%; from 200° F., to 225° F., 42.8%; from 225° F., to 250° F., 12.6%; and from 250° F., to 275° F., 5.4%.

Witness my hand this 19th day of May, 1915.

JAMES GREER.

Witnesses:
AUSTIN J. MCMAHON;
GEO. WESLEY WILDEY.